United States Patent
Zhang

(10) Patent No.: US 11,762,355 B2
(45) Date of Patent: Sep. 19, 2023

(54) SWITCH CIRCUIT AND CONTROL METHOD THEREOF, SMART SWITCH AND CONTROL SYSTEM

(71) Applicant: BEIJING XIAOMI MOBILE SOFTWARE CO., LTD., Beijing (CN)

(72) Inventor: He Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/209,951

(22) Filed: Mar. 23, 2021

(65) Prior Publication Data

US 2021/0405600 A1  Dec. 30, 2021

(30) Foreign Application Priority Data

Jun. 28, 2020 (CN) .......................... 202010600475.X

(51) Int. Cl.
*H02J 13/00* (2006.01)
*G05B 19/042* (2006.01)

(52) U.S. Cl.
CPC ...... *G05B 19/042* (2013.01); *H02J 13/00036* (2020.01); *G05B 2219/2642* (2013.01); *H02J 2207/50* (2020.01)

(58) Field of Classification Search
USPC ......................................................... 700/28
See application file for complete search history.

(56) References Cited

U.S. PATENT DOCUMENTS

| 10,201,064 | B1 | 2/2019 | Soto et al. |
| 2014/0067143 | A1 | 3/2014 | Chen et al. |
| 2017/0155526 | A1 | 6/2017 | Li |
| 2019/0182942 | A1* | 6/2019 | Kamp .................... H05B 45/00 |

FOREIGN PATENT DOCUMENTS

| CN | 110536519 A | * | 12/2019 |
| EP | 3280045 A1 | | 2/2018 |
| KR | 102121193 B1 | * | 6/2020 |
| KR | 102121193 B1 | | 6/2020 |

OTHER PUBLICATIONS

European Patent Application 21165016.3 extended Search and Opinion, dated Sep. 28, 2021, 7 pages.
Indian Patent Application 202144013481, Office Action dated Feb. 3, 2022, 5 pages.
Korean Patent Application 10-2021-0035075, Office Action dated Nov. 10, 2022, 5 pages.
Korean Patent Application 10-2021-0035075, English translation of Office Action dated Nov. 10, 2022, 5 pages.

* cited by examiner

*Primary Examiner* — Emilio J Saavedra
(74) *Attorney, Agent, or Firm* — COZEN O'CONNOR

(57) ABSTRACT

The present disclosure provides a switch circuit and a control method thereof, a smart switch and a control system. The switch circuit includes a wireless communication module, a switch module coupled to a load, a switch-on power obtaining circuit, an energy storage circuit coupled with the wireless communication module and a switch-off power obtaining circuit. The load is coupled with a neutral wire. The switch-on power obtaining circuit is configured to output a first current to the energy storage circuit in response to the switch module being switched on. The switch-off power obtaining circuit is configured to output a second current to the energy storage circuit via the second power supply terminal in response to the switch module being switched off. The second current is less than the first current.

19 Claims, 4 Drawing Sheets

SWITCH CIRCUIT AND CONTROL METHOD THEREOF, SMART SWITCH AND CONTROL SYSTEM

CROSS-REFERENCE TO RELATED APPLICATION

This application is based on and claims priority to Chinese Patent Application Serial No. 202010600475.X, filed on Jun. 28, 2020, the entire contents of which are incorporated herein by reference.

TECHNICAL FIELD

The disclosure relates to a field of smart device technologies, and more particularly to a switch circuit and a control method thereof, a smart device and a control system.

BACKGROUND

With the rapid development of smart home industry, smart appliances are becoming more and more popular, the traditional mechanical switch cannot adapt to the smart appliances, and smart switches with wireless communication module come into being.

SUMMARY

An aspect of the present disclosure provides a switch circuit. The switch circuit includes:

a wireless communication module;

a switch module, coupled to a load, wherein the load is coupled with a neutral wire;

an energy storage circuit, coupled with the wireless communication module;

a switch-on power obtaining circuit, wherein an input terminal of the switch-on power obtaining circuit is coupled with a live wire, the switch-on power obtaining circuit includes a first load coupling terminal and a first power supply terminal, the first load coupling terminal is coupled with the switch module, the first power supply terminal is coupled with the energy storage circuit, and the switch-on power obtaining circuit is configured to output a first current to the energy storage circuit via the first power supply terminal in response to the switch module being switched on; and a switch-off power obtaining circuit, wherein an input terminal of the switch-off power obtaining circuit is coupled with the live wire, the switch-off power obtaining circuit includes a second load coupling terminal and a second power supply terminal, the second load coupling terminal is coupled between the load and the switch module, the second power supply terminal is coupled with the energy storage circuit, and the switch-off power obtaining circuit is configured to output a second current to the energy storage circuit via the second power supply terminal in response to the switch module being switched off, in which the second current is less than the first current.

Another aspect of the present disclosure provides a control method of a switch circuit. The switch circuit includes a wireless communication module, a switch module coupled with a load coupled with a neutral wire, an energy storage circuit, a switch-on power obtaining circuit, a switch-off power obtaining circuit; the energy storage circuit is coupled with the wireless communication module; an input terminal of the switch-on power obtaining circuit is coupled with a live wire, the switch-on power obtaining circuit comprises a first load coupling terminal and a first power supply terminal, the first load coupling terminal is coupled with the switch module, the first power supply terminal is coupled with the energy storage circuit; an input terminal of the switch-off power obtaining circuit is coupled with the live wire, the switch-off power obtaining circuit comprises a second load coupling terminal and a second power supply terminal, the second load coupling terminal is coupled between the load and the switch module, the second power supply terminal is coupled with the energy storage circuit; and the method includes:

outputting a first current by the switch-on power obtaining circuit to the energy storage circuit via the first power supply terminal in response to the switch module being switched on; and outputting a second current by the switch-off power obtaining circuit to the energy storage circuit via the second power supply terminal in response to the switch module being switched off, in which the second current is less than the first current.

Another aspect of the present disclosure provides a smart switch. The smart switch includes any switch circuit described above.

Another aspect of the present disclosure provides a control system. The control system includes:

the smart switch described above, coupled with a live wire;

a load, coupled with a neutral wire and the smart switch respectively; and a terminal, coupled with the smart switch through a wireless network, and configured to control the smart switch to switch on or off.

DETAILED DESCRIPTION

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the disclosure. Rather, they are only examples of apparatuses and methods consistent with some aspects of the disclosure as detailed in the appended claims.

The terms used in this disclosure are for the purpose of describing specific embodiments only and are not intended to limit this disclosure. Unless otherwise defined, the technical or scientific terms used in this disclosure shall be in the common sense understood by persons of general skill in the field to which the disclosure belongs. The words "first", "second" and similar terms used in the specification and claims of the disclosure do not imply any order, quantity or importance, but are used only to distinguish between components. Similarly, words like "one" or "a" do not indicate a quantitative limit, but rather the existence of at least one. Unless otherwise noted, words such as "include" or "contain" imply that the element or object now preceding "include" or "contain" covers the element or object listed after "include" or "contain" and its equivalent, and does not exclude other elements or objects. Terms such as "coupling" or "coupled" are not limited to physical or mechanical connections, but may include electrical connections, whether direct or indirect.

The singular forms "a", "said" and "the" used in the specification of the disclosure and the attached claims are also intended to include plural forms, unless the context clearly implies otherwise. It should also be understood that the term "and/or" used in this context means and includes any or all possible combinations of one or more associated listed items.

Figure 1:
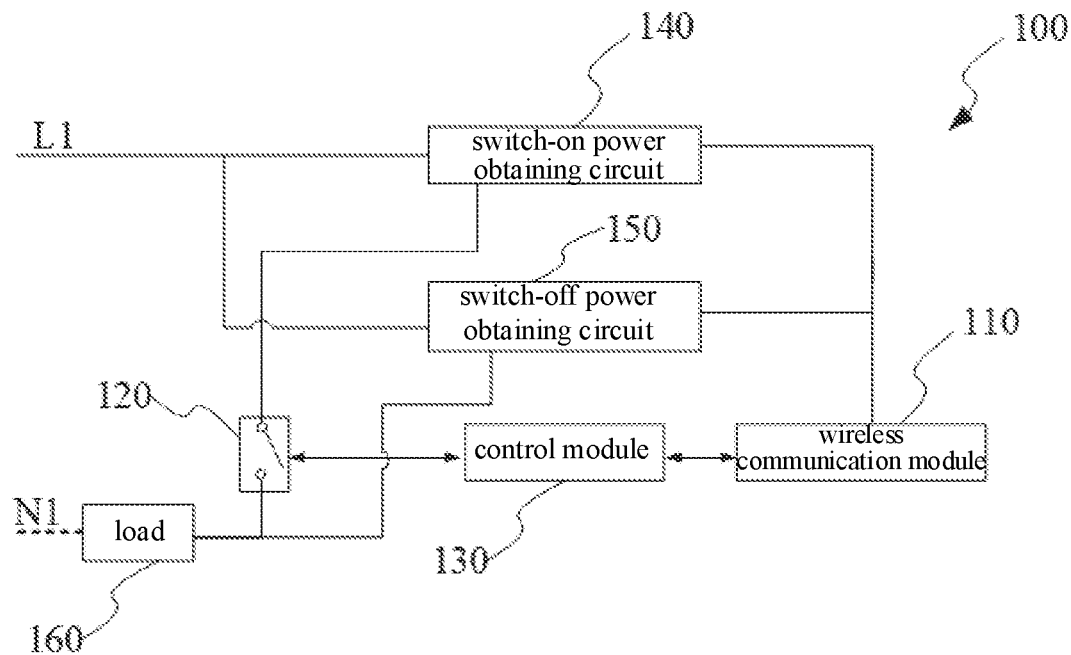
FIG. 1 is a schematic diagram illustrating a switch circuit of a smart switch provided in the related art.

FIG. 1 is a schematic diagram illustrating a switch circuit 100 of a smart switch provided in the relate art. Referring to FIG. 1, the switch circuit 100 includes a wireless communication module 110, a switch module 120, a control module 130, a switch-on power obtaining circuit 140 and a switch-off power obtaining circuit 150. The switch module 120 is coupled with a load 160. The load 160 is coupled with a neutral wire N1. The switch-on power obtaining circuit 140 includes an input terminal, a first load coupling terminal and a first power supply terminal. The switch-off power obtaining circuit 150 includes an input terminal, a second load coupling terminal and a second power supply terminal. The input terminal of the switch-on power obtaining circuit 140 is coupled with a live wire L1. The first load coupling terminal is coupled with the switch module 120. The first power supply terminal is coupled with the wireless communication module 110. The input terminal of the switch-off power obtaining circuit 150 is coupled with the live wire L1. The second load coupling terminal is coupled between the load 160 and the switch module 120. The second power supply terminal is coupled with the wireless communication module 110.

When the control module 130 controls the switch module 120 to switch on based on a switch-on signal outputted by the wireless communication module 110, the switch-on power obtaining circuit 140 is coupled to the live wire L1 and the neutral wire N1, the switch-on power obtaining circuit 140 obtains power and supplies power for the wireless communication module 110, and meanwhile the load 160 is working. When the control module 130 controls the switch module 120 to switch off based on a switch-off signal outputted by the wireless communication module 110, the switch-off power obtaining circuit 150 is coupled to the live wire L1 and the neutral wire N1, the switch-off power obtaining circuit 150 obtains power and supplies power for the wireless communication module 110, and meanwhile the load 160 stops working.

However, when the power of the wireless communication module 110 is larger, the current following through the switch-off power obtaining circuit 150 is larger, which will make the switch-off power obtaining circuit 150 outputs a relatively high current to the load, such that it is easy to make the load work when the switch module 120 is switched off. When the load 160 is a lamp, a "ghost fire" phenomenon is caused.

In order to solve the above problem, the present disclosure provides a switch circuit and control method thereof, a smart switch and a control system, which will be described in detail below with reference to drawings.

Figure 2:
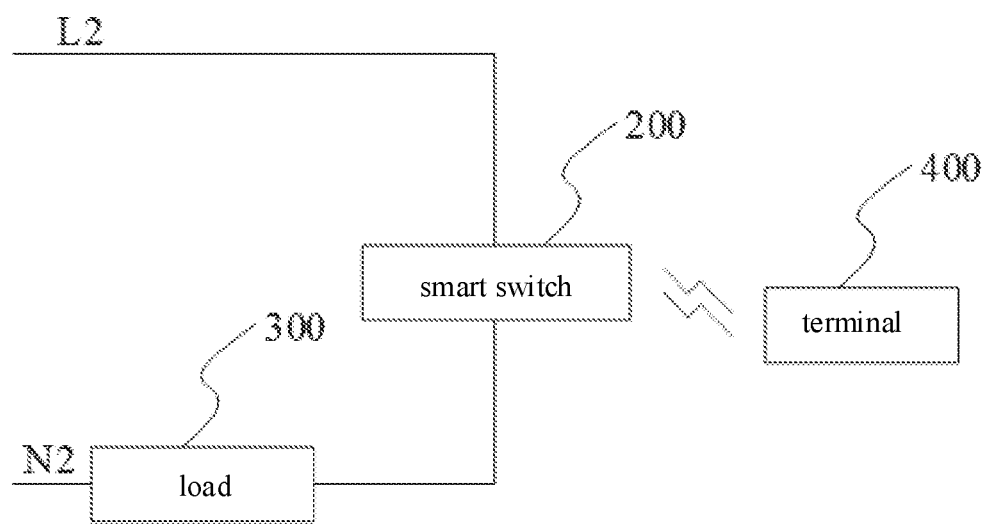
FIG. 2 is a schematic diagram illustrating a control system according to an exemplary embodiment of the present disclosure.

FIG. 2 is a schematic diagram of a control system according to an example embodiment of the present disclosure. The control system provided by some embodiments of the present disclosure includes a smart switch 200, a load 300 and a terminal. The smart switch 200 is coupled with the live wire L2. The load 300 is coupled with the neutral wire N2 and the smart switch 200 respectively. That is, the smart switch 200 is a single-fire smart switch, and the smart switch 200 forms a loop by means of the neutral wire N2 on the load 300. The terminal 400 is connected with the smart switch 200 through a wireless network, and is configured to control the smart switch 200 to switch on or off. When the terminal 400 controls the smart switch 200 to form a closed circuit with the load 300 and the live wire L2 (i.e., controls the smart switch 200 to switch on), the load 300 works. When the terminal 400 controls the smart switch 200 to form an open circuit with the load 300 and the live wire L2 (i.e., controls the smart switch 200 to switch off), the load 300 stops working.

For example, the load 300 includes a smart appliance, such as a lamp, a curtain and a fan. The terminal 400 includes but is not limited to a mobile phone, a tablet computer, an iPad, a digital broadcast terminal, a messaging device, a game console, a medical device, a fitness device, a personal digital assistant, a smart wearable device, a smart TV, a sweeping robot and a smart speaker.

Figure 3:
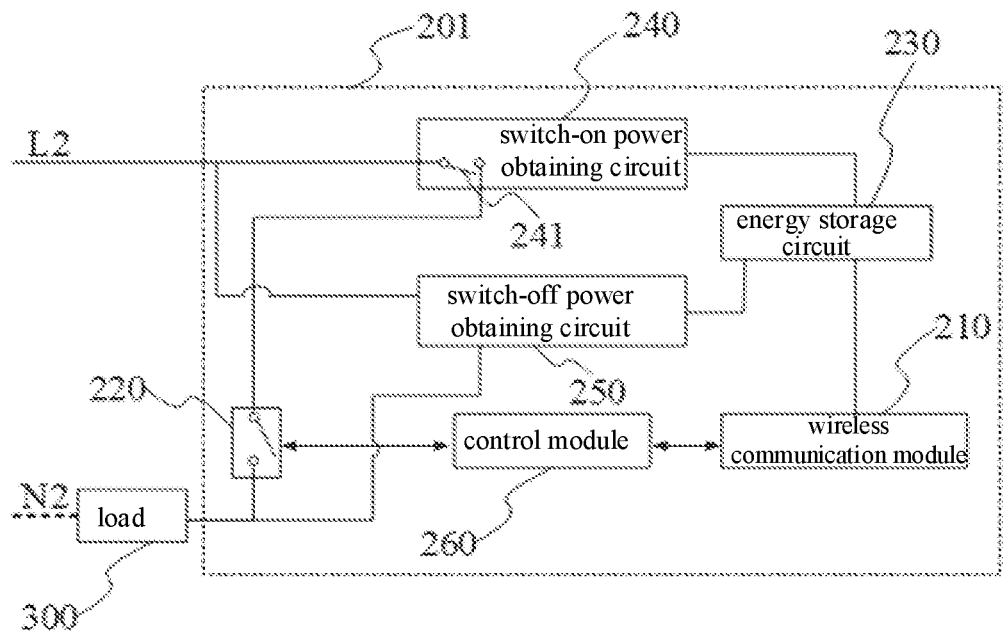
FIG. 3 is a schematic diagram illustrating a switch circuit of a smart switch according to an exemplary embodiment of the present disclosure.

In some embodiments, the smart switch 200 includes a switch circuit 201. FIG. 3 is a schematic diagram of a switch circuit 201 of a smart switch 200 according to an example embodiment of the present disclosure. Referring to FIG. 3, the switch circuit 201 includes a wireless communication module 210, a switch module 220, an energy storage circuit 230, a switch-on power obtaining circuit 240 and a switch-off power obtaining circuit 250.

The wireless communication module 210 is configured to be wirelessly connected with the terminal 400, to realize interaction between the smart switch 200 and the terminal 400.

The switch module 220 is coupled with the load 300. The load 300 is coupled with neutral wire N2.

The input terminal of the switch-on power obtaining circuit 240 is coupled with the live wire L2. The switch-on power obtaining circuit 240 includes a first load coupling terminal and a first power supply terminal. The first load coupling terminal is coupled with the switch module 220. The first power supply terminal is coupled with the energy storage circuit 230. The switch-on power obtaining circuit 240 is configured to output a first current to the energy storage circuit 230 via the first power supply terminal in response to the switch module 220 being switched on. That is, when the switch module 220 is switched on, the live wire L2, the first load coupling terminal of the switch-on power obtaining circuit 240, the switch module 220, the load 300 and the neutral wire N2 form a loop, and the load 300 works. The switch-on power obtaining circuit 240 obtains power from the live wire L2 and outputs the first current to the energy storage circuit 230 via the first power supply terminal, such that the energy storage circuit 230 stores energy.

For example, the switch-on power obtaining circuit 240 includes a switch 241. The switch 241 is coupled with the live wire L2 and the switch module 220 respectively. The switch 241 is switched on in response to the switch module 220 being switched on, such that the switch-off power obtaining circuit 250 is short circuited, and the switch-on power obtaining circuit 240 forms a closed loop with the live wire L2 and the load 300. The switch 241 is switched off in response to the switch module 220 being switched off, such that the switch-on power obtaining circuit 240 is open circuited.

The input terminal of the switch-off power obtaining circuit 250 is coupled with the live wire L2. The switch-off power obtaining circuit 250 includes a second load coupling terminal and a second power supply terminal. The second load coupling terminal is coupled between the load 300 and the switch module 220. The second power supply terminal is coupled with the energy storage circuit 230. The switch-off power obtaining circuit 250 is configured to output a second current to the energy storage circuit 230 via the second power supply terminal in response to the switch module 220 being switched off. The second current is less than the first current. That is, when the switch module 220 is switched off, the live wire L2, the second load coupling terminal of the switch-off power obtaining circuit 250, the load 300 and the neutral wire N2 form a loop, but the load 300 does not work. The switch-off power obtaining circuit 250 obtains power from the live wire L2 and outputs the second current to the energy storage circuit 230 via the second power supply terminal, to supplement the energy outputted by the energy storage circuit 230 to the wireless communication module 210.

A third current in the loop formed between the live wire L2, the second load coupling terminal of the switch-off power obtaining circuit 250, the load 300 and the neutral wire N2 is positively related with the second current. In a case where the switch module 220 is switched off, when the third current flowing through the load 300 is exactly the working current of the load 300, the load 300 works, and the switch-off power obtaining circuit 250 outputs a current with a size of a reference threshold to the energy storage circuit 230. In embodiments of the present disclosure, the second current is less than the reference threshold, such that the third current flowing through the load 300 is less than the working current of the load 300, and the load 300 will not work. When the power of the wireless communication module 210 is larger, the energy storage circuit 230 supplies power for the wireless communication module 210, instead of supplying power for the wireless communication module 210 by the switch-off power obtaining circuit 250, which will not affect the size of the second current outputted by the switch-off power obtaining circuit 250 to the energy storage circuit 230 via the second power supply terminal. Moreover, the second current is less than the first current, such that the current flowing through the load 300 is less than the working current of the load 300. When the load 300 is the lamp, the "ghost fire" phenomenon will not appear.

Based on above, when the switch module 220 is switched on, the switch-on power obtaining circuit 240 obtains power from the live wire L2 and charges the energy storage circuit 230, and when the switch module 220 is switched off, the switch-off power obtaining circuit 250 obtains power from the live wire L2 and charges the energy storage circuit 230. Since the switch-off power obtaining circuit 250 is coupled with the energy storage circuit 230, instead of coupled with the wireless communication module 210 directly, when the power of the wireless communication module 210 is larger, the energy storage circuit 230 outputs relatively high power to the wireless communication module 210 directly, which will not affect a size of the second current outputted by the switch-off power obtaining circuit 250 to the energy storage circuit 230, and thus will not increase the third current flowing through the load 300 to the working current, and further will not make the load 300 work in the state of the switch module 220 being switched off. Moreover, the second current is less than the first current, which makes the third current flowing through the load 300 relatively small. When the switch module 220 is switched on, the switch-on power obtaining circuit 240 charges the energy storage circuit 230 rapidly, and when the switch module 220 is switched off, the switch-off power obtaining circuit 250 supplements the electric energy outputted by the energy storage circuit 230 to the wireless communication module 210.

For example, when the load 300 is the lamp, since the current flowing through the lamp will not reach the working current, the "ghost fire" phenomenon will not appear.

Figure 4:
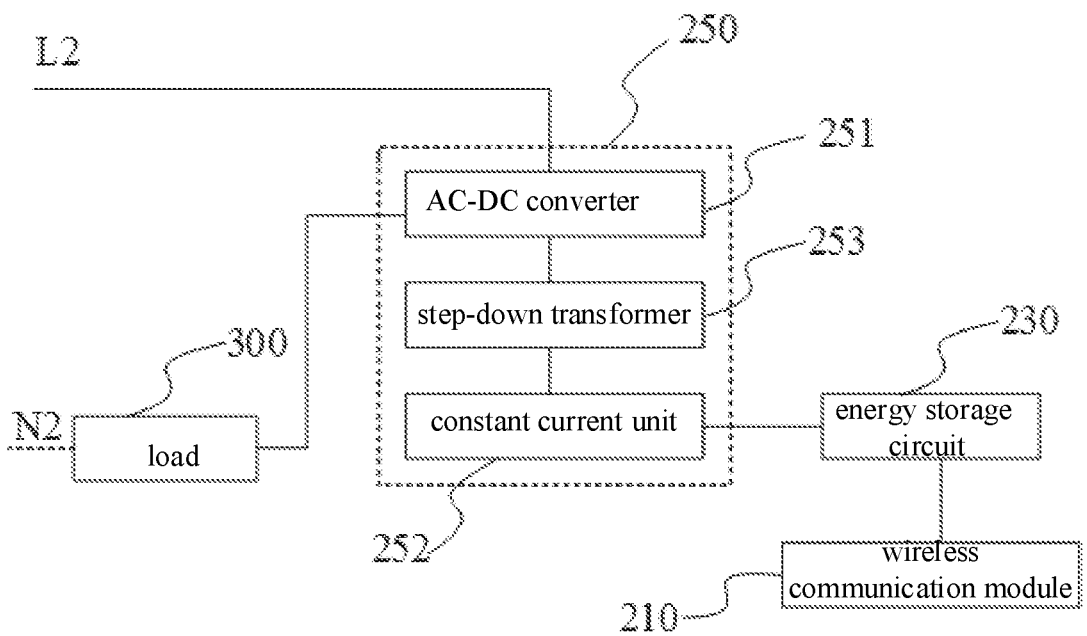
FIG. 4 is a schematic diagram illustrating an equivalent circuit when a switch module in a switch circuit is switched off according to an exemplary embodiment of the present disclosure.

FIG. 4 is a schematic diagram illustrating an equivalent circuit when a switch module 220 in a switch circuit 201 is switched off according to an exemplary embodiment of the present disclosure. In some embodiments, referring to FIG. 4, the switch-off power obtaining circuit 250 further includes an AC-DC (Alternating Current-Direct Current) converter 251 and a constant current unit 252. An input terminal of the AC-DC converter 251 is coupled with the live wire L2. The AC-DC converter 251 includes a first output terminal and a second output terminal. The first output terminal is configured as the second load coupling terminal. The first output terminal is coupled with the load 300. The second output terminal is coupled with the constant current unit 252. An output terminal of the constant current unit 252 is configured as the second power supply terminal, and is coupled with the energy storage circuit 230. The constant current unit 252 is configured to output a constant current as the second current. It should be noted that, the current outputted from the first output terminal of the AC-DC converter 251 to the load 300 is not converted by the AC-DC converter 251. After converting the alternating current inputted from the live wire L2 to the direct current, the AC-DC converter 251 outputs the direct current to the constant current unit 252, which is beneficial for the constant current unit 252 to output the constant current. In a case where the switch module 220 is switched off, when the power of the wireless communication module 210 is larger, the energy storage circuit 230 outputs the relatively high power to the wireless communication module 210, but the constant current unit 252 in the switch-off power obtaining circuit 250 outputs the constant current to the energy storage circuit 230, in which the constant current will not change, such that the third current flowing through the load 300 will not change, which will not cause the load to work.

In some embodiments, continuing to refer to FIG. 4, the switch-off power obtaining circuit 250 further includes a step-down transformer 253. An input terminal of the step-down transformer 253 is coupled with the second output terminal of the AC-DC converter 251. An output terminal of the step-down transformer 253 is coupled with the constant current unit 252. In this way, the step-down transformer 253 steps down the direct current outputted from the AC-DC converter 251 and then outputs the current to the constant current unit 252, which is beneficial for the constant current unit 252 to output a relatively small constant current, which makes the third current flowing through the load 300 relatively small, and will not cause the load 300 to work.

For example, the step-down transformer includes a LDO (Low Dropout Regulator) or a DC chopper.

In embodiments of the present disclosure, the constant current unit 252 may be configured in various forms. The following embodiments are given based on the premise of simple structure.

Figure 5:
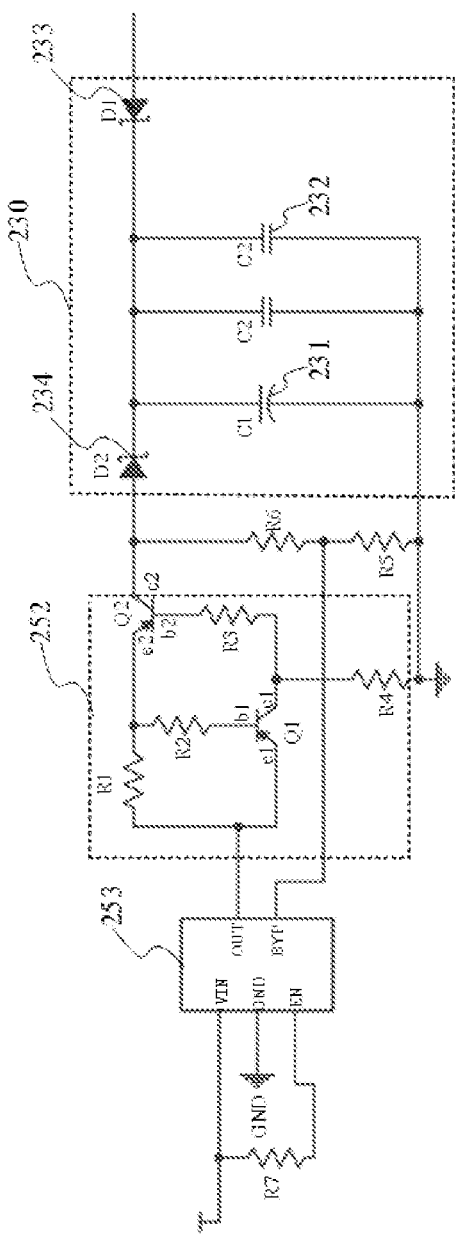
FIG. 5 is a schematic diagram illustrating a part of a switch circuit according to an exemplary embodiment of the present disclosure.

FIG. 5 is a schematic diagram illustrating a part of a switch circuit 201 according to an exemplary embodiment of the present disclosure. In some embodiments, referring to FIG. 5, the constant current unit 252 includes a first transistor Q1, a second transistor Q2 and a first resistor R1. The first transistor Q1 includes a first base b1, a first electrode and a second electrode. The second transistor Q2 includes a second base b2, third electrode and a fourth electrode. Both a first terminal of the first resistor R1 and the first electrode are coupled with the output terminal OUT of the step-down transformer 253. A second terminal of the first resistor R1 is coupled with the third electrode. The first base b1 is coupled between the first resistor R1 and the third electrode. The second electrode is coupled with the second base b2. The fourth electrode is configured to output current to the wireless communication module 210. In this way, the voltage across both terminals of the first resistor R1 is about the voltage difference between the first electrode and the first base b1, and the resistance of the first resistor R1 does not change, so that the constant current unit 252 outputs the constant current.

For example, the first transistor Q1 and the second transistor Q2 are both NPN transistors. The first electrode of the first transistor Q1 is a first emitter e1, the second electrode is a first collector c1, the third electrode of the second transistor Q2 is a second emitter e2, and the fourth electrode is a second collector c2. The first terminal of the first resistor R1 is coupled with the first emitter e1 of the first transistor Q1 and the output terminal OUT of the step-down transformer 253. The second terminal of the first resistor R1 is coupled with the second emitter e2. The first base b1 of the first transistor Q1 is coupled between the first resistor R1 and the second emitter e2. The first collector c1 is coupled with the second base b2. The second collector c2 is coupled with the energy storage circuit 230. In addition, the first base b1 may be coupled between the first resistor R1 and the second emitter e2 via the second resistor R2, the second base b2 may be coupled to the first collector c1 via the third resistor R3, and the first collector c1 may be grounded via the fourth resistor R4. In this way, a quotient of the voltage Vbe between the first base b1 of the first transistor Q1 and the first emitter e1 divided by the resistance of the first resistor R1 is about the constant current outputted by the constant current unit 252. The constant current may be adjusted by adjusting the resistance of the first resistor R1, such that the current flowing through the load 300 is less than the working current of the load 300.

In other embodiments, the first transistor Q1 and the second transistor Q2 are both PNP transistors.

In some embodiments, continuing to refer to FIG. 5, the energy storage circuit 230 includes an energy storage unit 231. The energy storage unit 231 includes a super-capacitor C1. A first terminal of the super-capacitor C1 is coupled with the wireless communication module 210, the first power supply terminal of the switch-on power obtaining circuit 240 and the second power supply terminal of the switch-off power obtaining circuit 250 respectively. A second terminal of the super-capacitor C1 is grounded. When the switch module 220 is switched off, since the power consumption of the wireless communication module 210 in some working states is larger, the super-capacitor C1 supplies power for the wireless communication module 210, instead of supplying power for the wireless communication module 210 directly by the switch-off power obtaining circuit 250. In this way, the super-capacitor C1 outputs a relatively large current to the wireless communication module 210, to meet the working requirement of the wireless communication module 210, which will not affect the size of the current outputted by the switch-off power obtaining circuit 250 to the load 300.

In some embodiments, continuing to refer to FIG. 5, the energy storage circuit 230 further incudes a filter unit 232 coupled in parallel with the energy storage unit 231, to play a function of filtering, and ensure that the super-capacitor C1 stably supplies power for the wireless communication module 210. For example, the filter unit 232 includes at least two capacitors C2 coupled in parallel with the super-capacitor C1.

In some embodiments, continuing to refer to FIG. 5, the energy storage circuit 230 further includes a first unidirectional conducive element 233 and a second unidirectional conducive element 234. The first unidirectional conducive element 233 is coupled between the first power supply terminal of the switch-on power obtaining circuit 240 and the energy storage unit 231. A forward direction of the first unidirectional conducive element 233 is from the first power supply terminal to the energy storage unit 231. The second unidirectional conducive element 234 is coupled between the second power supply terminal of the switch-off power obtaining circuit 250 and the energy storage unit 231. A forward direction of the second unidirectional conducive element 234 is from the second power supply terminal to the energy storage unit 231. When the switch-on power obtaining circuit 240 supplies power for the energy storage unit 231, the second unidirectional conducive element 234 avoids the switch-on power obtaining circuit 240 from outputting current to the switch-off power obtaining circuit 250 and avoids loss. When the switch-off power obtaining circuit 250 supplies power for the energy storage unit 231, the first unidirectional conducive element 233 avoids outputting current to the switch-on power obtaining circuit 240 via the second power supply terminal and avoids loss.

For example, the first unidirectional conducive element 233 includes a first diode D1. An anode of the first diode D1 is coupled with the first power supply terminal of the switch-on power obtaining circuit 240, and a cathode of the first diode D1 is coupled with the energy storage unit 231. For example, the second unidirectional conducive element 234 includes a second diode D2. An anode of the second diode D2 is coupled with the second power supply terminal of the switch-off power obtaining circuit 250, and a cathode of the second diode D2 is coupled with the energy storage unit 231.

In some embodiments, continuing to refer to FIG. 3, the switch circuit 201 further includes a control module 260. The control module 260 is coupled with the wireless communication module 210 and the switch module 220 respectively, and is configured to control the switch module 220 to switch on or off based on a signal outputted by the wireless communication module 210. For example, the external terminal 400 is connected with the wireless communication module 210, the terminal 400 sends a switch-on signal to the wireless communication module 210, the wireless communication module 210 sends the switch-on signal to the control module 260, and the control module 260 controls the switch module 220 to switch on based on the switch-on signal. The terminal 400 sends the switch-off signal to the wireless communication module 210, the wireless communication module 210 sends the switch-off signal to the control module 260, and the control module 260 controls the switch module 220 to switch off based on the switch-off signal. In this way, the switch module 220 is controlled to switch on or off through the cooperation of the wireless communication module 210 and the control module 260.

For example, the switch module 220 includes a relay.

Figure 6:
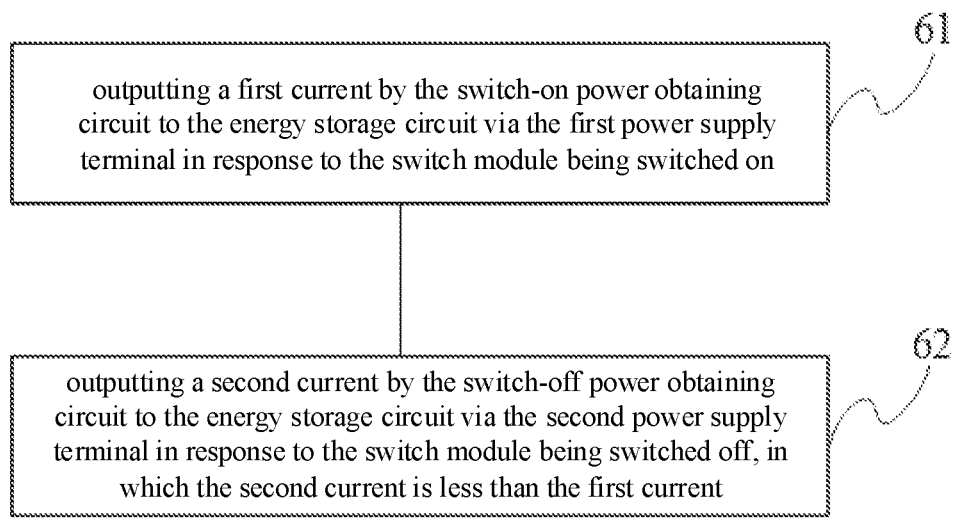
FIG. 6 is a flow chart illustrating a control method of a switch circuit according to an exemplary embodiment of the present disclosure.

FIG. 6 is a flow chart illustrating a control method of a switch circuit according to an exemplary embodiment of the present disclosure. Some embodiments of the present disclosure further provide a control method of a switch circuit. The switch circuit includes a wireless communication module, a switch module coupled with a load coupled with a neutral wire, an energy storage circuit, a switch-on power obtaining circuit and a switch-off power obtaining circuit. An input terminal of the switch-on power obtaining circuit is coupled with a live wire, the switch-on power obtaining circuit includes a first load coupling terminal and a first power supply terminal, the first load coupling terminal is coupled with the switch module, and the first power supply terminal is coupled with the energy storage circuit. An input terminal of the switch-off power obtaining circuit is coupled with the live wire, the switch-off power obtaining circuit includes a second load coupling terminal and a second power supply terminal, the second load coupling terminal is coupled between the load and the switch module, and the second power supply terminal is coupled with the energy storage circuit. Referring to FIG. 6, the control method includes the following.

At block 61, a first current is outputted by the switch-on power obtaining circuit to the energy storage circuit via the first power supply terminal in response to the switch module being switched on.

When the switch module is switched on, the live wire, the first load coupling terminal of the switch-on power obtaining circuit, the switch module, the load and the neutral wire are coupled to form a loop, the switch-on power obtaining circuit obtains power from the live wire and charges the energy storage circuit, and the energy storage circuit supplies power to the wireless communication module.

At block 62, a second circuit is outputted by the switch-off power obtaining circuit to the energy storage circuit via the second power supply terminal in response to the switch module being switched off, in which the second current is less than the first current.

When the switch module is switched off, the live wire, the second load coupling terminal of the switch-off power obtaining circuit, the load and the neutral wire are coupled to form a loop, the switch-off power obtaining circuit obtains power from the live wire and charges the energy storage circuit, and the energy storage circuit supplies power to the wireless communication module, instead of supplying power for the wireless communication module by the switch-off power obtaining circuit directly, which ensures that the second current will not increase with the increasing of the power of the wireless communication module, and thus the third current will not increase, such that the third current will not reach the working current of the load to cause the load to work.

Based on above, when the switch module is switched on, the switch-on power obtaining circuit obtains power from the live wire and charges the energy storage circuit, and when the switch module is switched off, the switch-off power obtaining circuit obtains power from the live wire and charges the energy storage circuit. Since the switch-off power obtaining circuit is coupled with the energy storage circuit, instead of coupled with the wireless communication module directly, when the power of the wireless communication module is larger, the energy storage circuit outputs relatively high power to the wireless communication module directly, which will not affect a size of the second current outputted by the switch-off power obtaining circuit to the energy storage circuit, and thus will not increase the third current flowing through the load to the working current, and further will not make the load work in the state of the switch module being switched off. Moreover, the second current is less than the first current, which makes the third current flowing through the load relatively small. When the switch module is switched on, the switch-on power obtaining circuit charges the energy storage circuit rapidly, and when the switch module is switched off, the switch-off power obtaining circuit supplements the electric energy outputted by the energy storage circuit to the wireless communication module.

In some embodiments, the switch-off power obtaining circuit includes a constant current unit. An output terminal of the constant current unit is configured as the second power supply terminal. Block 62 includes outputting a constant current as the second current by the constant current unit to the energy storage circuit in response to the switch module being switched off.

In this way, in a case where the switch module is switched off, when the power of the wireless communication module is larger, the energy storage circuit outputs the relatively high power to the wireless communication module, but the constant current unit of the switch-off power obtaining circuit outputs the constant current to the energy storage circuit, in which the constant current will not change, so that the third current flowing through the load will not change, which will not cause the load to work.

In some embodiments, the switch circuit further includes a control module coupled with the wireless communication module and the switch module. The control module provided by some embodiments of the present disclosure further includes controlling the switch module by the control module to switch on or off based on a signal outputted by the wireless communication module.

For example, the external terminal is coupled with the wireless communication module, the terminal sends a switch-on signal to the wireless communication module, the wireless communication module sends the switch-on signal to the control module, and the control module controls the switch module to switch on based on the switch-on signal. The terminal sends the switch-off signal to the wireless communication module, the wireless communication module sends the switch-off signal to the control module, and the control module controls the switch module to switch off based on the switch-off signal. In this way, the switch module is controlled to switch on or off through the cooperation of the wireless communication module and the control module. The smart switch may be controlled to switch on or off by the terminal, and further intelligently controlling the load whether to work is realized.

In an exemplary embodiment, a computer readable storage medium is also provided. The storage medium is stored thereon with a program. When the program is executed by a processor, any control method of the switch circuit mentioned above is implemented. The readable storage media may be ROM, random access memory (RAM), CD-ROM, magnetic tape, floppy disk and optical data storage devices, etc.

For method embodiments, since they are basically corresponding to device embodiments, please refer to the partial description of device embodiments for relevant information. Method embodiments and device embodiments complement each other.

The above embodiments disclosed herein may complement each other without conflict.

The foregoing is only a better implementation of this disclosure and is not intended to limit this disclosure. Any modifications, equivalents, substitutions, improvements and the like made within the spirit and principles of this disclosure shall be covered by the protection of this disclosure.

What is claimed is:

1. A switch circuit, comprising:
a wireless communication module;
a switch module, coupled to a load, wherein the load is coupled with a neutral wire;
an energy storage circuit, coupled with the wireless communication module;
a switch-on power obtaining circuit, wherein an input terminal of the switch-on power obtaining circuit is coupled with a live wire, the switch-on power obtaining circuit comprises a first load coupling terminal and a first power supply terminal, the first load coupling terminal is coupled with the switch module, the first power supply terminal is coupled with the energy storage circuit, and the switch-on power obtaining circuit is configured to output a first current to the energy storage circuit via the first power supply terminal in response to the switch module being switched on; and
a switch-off power obtaining circuit, wherein an input terminal of the switch-off power obtaining circuit is coupled with the live wire, the switch-off power obtaining circuit comprises a second load coupling terminal and a second power supply terminal, the second load coupling terminal is coupled between the load and the switch module, the second power supply terminal is coupled with the energy storage circuit, and the switch-off power obtaining circuit is configured to obtain power from the live wire and output a second current to the energy storage circuit via the second power supply terminal in response to the switch module being switched off, to supplement energy of the energy storage circuit output to the wireless communication module, in which the second current is less than the first current.

2. The switch circuit of claim 1, wherein the switch-off power obtaining circuit comprises an AC-DC converter and a constant current unit, an input terminal of the AC-DC converter is coupled with the live wire, the AC-DC converter comprises a first output terminal and a second output terminal, the first output terminal is configured as the second load coupling terminal, the second output terminal is coupled with the constant current unit, an output terminal of the constant current unit is configured as the second power supply terminal, and the constant current unit is configured to output a constant current as the second current.

3. The switch circuit of claim 2, wherein the switch-off power obtaining circuit further comprises a step-down transformer, an input terminal of the step-down transformer is coupled with the second output terminal of the AC-DC converter, and an output terminal of the step-down transformer is coupled with the constant current unit.

4. The switch circuit of claim 3, wherein the constant current unit comprises a first transistor, a second transistor and a first resistor, the first transistor comprises a first base, a first electrode and a second electrode, the second transistor comprises a second base, a third electrode and a fourth electrode;
a first terminal of the first resistor and the first electrode are coupled to the output terminal of the step-down transformer, a second terminal of the first resistor is coupled with the third electrode, the first base is coupled between the first resistor and the third electrode, the second electrode is coupled with the second base, and the fourth electrode is coupled with the energy storage circuit.

5. The switch circuit of claim 1, wherein the energy storage circuit comprises an energy storage unit, the energy storage unit comprises a super-capacitor, a first terminal of the super-capacitor is coupled with the wireless communication module, the first power supply terminal and the second power supply terminal respectively, and a second terminal of the super-capacitor is grounded.

6. The switch circuit of claim 5, wherein the energy storage circuit further comprises a filter unit coupled in parallel with the energy storage unit.

7. The switch circuit of claim 5, wherein the energy storage circuit further comprises a first unidirectional conductive element and a second unidirectional conductive element;
the first unidirectional conductive element is coupled between the first power supply terminal and the energy storage unit, and a forward direction of the first unidirectional conductive element is from the first power supply terminal to the energy storage unit;
the second unidirectional conductive element is coupled between the second power supply terminal and the energy storage unit, and a forward direction of the second unidirectional conductive element is from the second power supply terminal to the energy storage unit.

8. The switch circuit of claim 1, further comprising a control module coupled with the wireless communication module and the switch module respectively, and configured to control the switch module to switch on or off based on a signal outputted by the wireless communication module.

9. The switch circuit of claim 1, wherein the wireless communication module is configured to be connected to a terminal through a wireless network, and to receive a signal from the terminal.

10. A control method of a switch circuit, wherein the switch circuit comprises a wireless communication module, a switch module coupled with a load coupled with a neutral wire, an energy storage circuit, a switch-on power obtaining circuit and a switch-off power obtaining circuit; the energy storage circuit is coupled with the wireless communication module; an input terminal of the switch-on power obtaining circuit is coupled with a live wire, the switch-on power obtaining circuit comprises a first load coupling terminal and a first power supply terminal, the first load coupling terminal is coupled with the switch module, the first power supply terminal is coupled with the energy storage circuit; an input terminal of the switch-off power obtaining circuit is coupled with the live wire, the switch-off power obtaining circuit comprises a second load coupling terminal and a second power supply terminal, the second load coupling terminal is coupled between the load and the switch module, the second power supply terminal is coupled with the energy storage circuit; and the method comprises:

outputting a first current by the switch-on power obtaining circuit to the energy storage circuit via the first power supply terminal in response to the switch module being switched on; and obtaining, by the switch-off power obtaining circuit, power from the live wire and outputting a second current by the switch-off power obtaining circuit to the energy storage circuit via the second power supply terminal in response to the switch module being switched off, to supplement energy of the energy storage circuit output to the wireless communication module, in which the second current is less than the first current.

11. The control method of claim 10, wherein the switch-off power obtaining circuit comprises a constant current unit, an output terminal of the constant current unit is configured as the second power supply terminal, and outputting the second current by the switch-off power obtaining circuit to the energy storage circuit via the second power supply terminal in response to the switch module being switched off comprises:

outputting a constant current as the second current by the constant current unit to the energy storage circuit in response to the switch module being switched off.

12. The control method of claim 10, wherein the switch circuit further comprises a control module coupled with the wireless communication module and the switch module respectively, and the control method further comprises:

controlling the switch module by the control module to switch on or off based on a signal outputted by the wireless communication module.

13. The control method of claim 12, further comprising:
receiving the signal from a terminal by the wireless communication module, wherein the terminal is connected with the wireless communication module through a wireless network.

14. A control system for a load, wherein the load is coupled with a neutral wire, the control system comprising:
a smart switch, coupled to a live wire and the load respectively; and
a terminal, coupled to the smart switch via a wireless network, and configured to control the smart switch to switch on or off by sending a control signal to the smart switch, so as to control the load to work or not;
wherein the smart switch comprises:
a wireless communication module;
a switch module, coupled to the load;
an energy storage circuit, coupled with the wireless communication module;
a switch-on power obtaining circuit, wherein an input terminal of the switch-on power obtaining circuit is coupled with a live wire, the switch-on power obtaining circuit comprises a first load coupling terminal and a first power supply terminal, the first load coupling terminal is coupled with the switch module, the first power supply terminal is coupled with the energy storage circuit, and the switch-on power obtaining circuit is configured to output a first current to the energy storage circuit via the first power supply terminal in response to the switch module being switched on; and
a switch-off power obtaining circuit, wherein an input terminal of the switch-off power obtaining circuit is coupled with the live wire, the switch-off power obtaining circuit comprises a second load coupling terminal and a second power supply terminal, the second load coupling terminal is coupled between the load and the switch module, the second power supply terminal is coupled with the energy storage circuit, and the switch-off power obtaining circuit is configured to obtain power from the live wire and output a second current to the energy storage circuit via the second power supply terminal in response to the switch module being switched off, to supplement energy of the energy storage circuit output to the wireless communication module, in which the second current is less than the first current.

15. The control system of claim 14, wherein the switch-off power obtaining circuit comprises an AC-DC converter and a constant current unit, an input terminal of the AC-DC converter is coupled with the live wire, the AC-DC converter comprises a first output terminal and a second output terminal, the first output terminal is configured as the second load coupling terminal, the second output terminal is coupled with the constant current unit, an output terminal of the constant current unit is configured as the second power supply terminal, and the constant current unit is configured to output a constant current as the second current.

16. The control system of claim 15, wherein the switch-off power obtaining circuit further comprises a step-down transformer, an input terminal of the step-down transformer is coupled with the second output terminal of the AC-DC converter, and an output terminal of the step-down transformer is coupled with the constant current unit.

17. The control system of claim 16, wherein the constant current unit comprises a first transistor, a second transistor and a first resistor, the first transistor comprises a first base, a first electrode and a second electrode, the second transistor comprises a second base, a third electrode and a fourth electrode;

a first terminal of the first resistor and the first electrode are coupled to the output terminal of the step-down transformer, a second terminal of the first resistor is coupled with the third electrode, the first base is coupled between the first resistor and the third electrode, the second electrode is coupled with the second base, and the fourth electrode is coupled with the energy storage circuit.

18. The control system of claim 14, wherein the energy storage circuit comprises an energy storage unit, the energy storage unit comprises a super-capacitor, a first terminal of the super-capacitor is coupled with the wireless communication module, the first power supply terminal and the second power supply terminal respectively, and a second terminal of the super-capacitor is grounded.

19. The control system of claim 18, wherein the energy storage circuit further comprises a first unidirectional conductive element and a second unidirectional conductive element;
the first unidirectional conductive element is coupled between the first power supply terminal and the energy storage unit, and a forward direction of the first unidirectional conductive element is from the first power supply terminal to the energy storage unit;
the second unidirectional conductive element is coupled between the second power supply terminal and the energy storage unit, and a forward direction of the second unidirectional conductive element is from the second power supply terminal to the energy storage unit.

* * * * *